Figure 1:
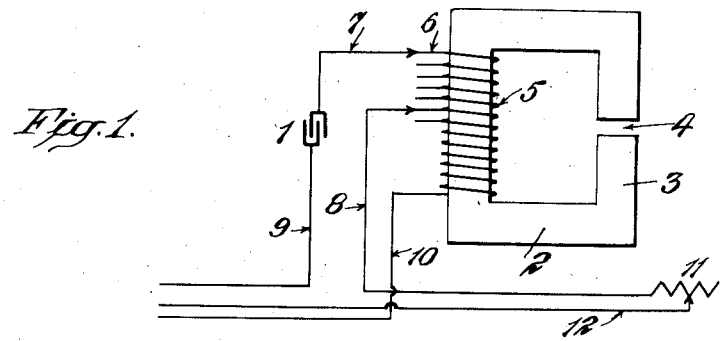

April 2, 1940.                R. R. MINER                2,195,969
       CURRENT REGULATOR FOR ALTERNATING CURRENT POWER CIRCUITS
                        Filed Feb. 12, 1937

INVENTOR
ROLAND R. MINER
BY
ATTORNEY

Patented Apr. 2, 1940

2,195,969

UNITED STATES PATENT OFFICE 2,195,969

CURRENT REGULATOR FOR ALTERNATING CURRENT POWER CIRCUITS

Roland R. Miner, Wichita, Kans.

Application February 12, 1937, Serial No. 125,369

11 Claims. (Cl. 171—119)

This invention relates to current regulators for alternating current power circuits, and aims to provide means for regulating the amperage of the current in a variable impedance load and for maintaining the magnitude constant at any desired value notwithstanding changes in the load impedance.

A regulator embodying my invention maintains a constant current without the use of moving parts, by providing a capacity and an inductance of equal reactance.

A capacity and an inductance connected in series to a constant voltage source of alternating current will maintain a current of constant amperage in a variable impedance load circuit connected across either the inductance or the capacity, provided that the reactances of the capacity and the inductance are of equal magnitude and opposite in sign, and their resistances are negligible. In such a circuit, increases in the load impedance do not alter the load current, but have the effect of increasing the current in the capacity and in the inductance and of increasing the voltage across each of them. If the load impedance is made infinite by opening the load circuit, the voltages across the capacity and inductance will rise to very high values, owing to the resonant condition resulting from their equality in reactance.

While such a circuit provides a theoretically perfect means for maintaining a current of constant amperage in a load of variable impedance, its practical use for power transmission presents serious difficulties. In the first place, the reactance of an inductance must be kept constant so as to equal the reactance of a condenser. This can be accomplished by use of an air-core coil as the inductance; and, if such a coil were used, its resistance could not be made negligible in comparison with its reactance, and it would be far too large and expensive to be of practical use in a power circuit. In the second place, the rise of the voltage across the condenser to an extreme (theoretically infinite) value on accidental breakage of the load circuit presents a serious danger of destruction of the entire regulating circuit.

By my invention, I have overcome these difficulties and provided a practical and economical regulating apparatus containing a capacity and an inductance of substantially equal reactance connected in series. In accordance with my invention, the inductance is provided by a special form of power transformer having a magnetic metal core containing an air gap to increase the reluctance of the magnetic circuit. The reactance of a coil on such a core varies only slightly with variations in the current through the coil until the current rises so high that the saturation point of the metal part of the core is reached. Further increases in the current then cause a sharp change in the reactance of the coil. In series with the input circuit of the transformer is a condenser whose reactance is substantially equal to the substantially constant value of the reactance of the input circuit of the transformer when the metal part of the core is unsaturated and unequal to it when the metal part of the core is saturated. Consequently, the regulator maintains a substantially constant amperage in a load of variable impedance under normal load conditions and, at the same time, avoids danger of overstressing the regulator and, particularly the condenser, when the load circuit is opened. Furthermore, the device is economical, since the inductance used for maintaining the amperage constant is also used as a transformer by which changes in the load current may be effected as desired, and a power factor nearly equal to unity is provided and maintained.

A further feature of the invention consists in counteracting the slight change in the load current caused by the unavoidable presence of some resistance in the regulator by the changes in the load current caused by the slight variation of the reactance of the input circuit of the transformer which occurs below the saturation point of the metal part of the core. This counterbalancing is accomplished, in accordance with my invention, by making the reactance of the condenser equal to the reactance of the input circuit of the transformer when the load impedance is at full load value. The result of this counterbalancing is to obtain very accurate constant amperage conditions in the load circuit from no load to full load.

Figure 2:
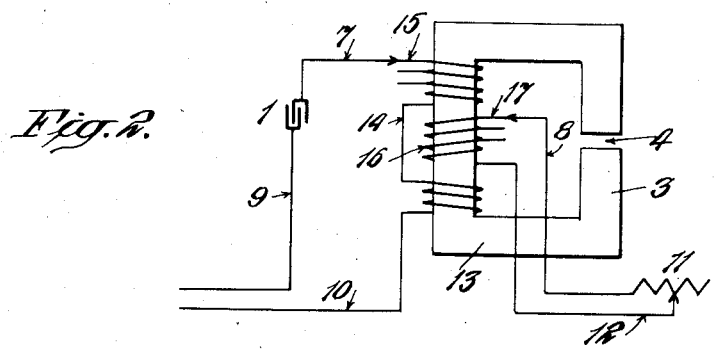
Figure 3:
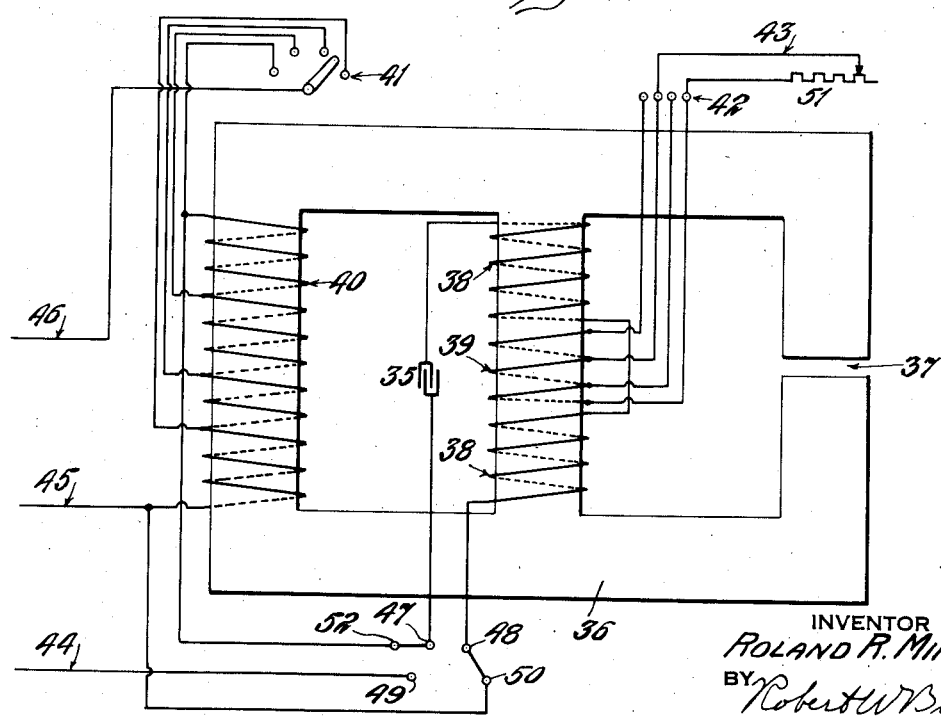

These and other features of my invention will be fully described in connection with the illustrative embodiments of the invention which are shown in the accompanying diagrammatic drawing, in which Fig. 1 shows a regulator incorporating an auto transformer adapted for use on single- or three-phase circuits;

Fig. 2 shows a regulator incorporating a two-coil transformer adapted for use on a single-phase circuit; and Fig. 3 shows a regulator incorporating a three-coil transformer adapted for use on a single- or three-phase circuit.

The regulator shown in Fig. 1 consists of a condenser 1 and a transformer 2 having an iron core 3 containing an air gap 4 and a winding 5 equipped with taps 6. The condenser is connected in series in the input circuit of the transformer, which includes a wire 9 connected to the condenser, a wire 7 connecting the condenser to one of the taps 6 of the coil 5, and a wire 10 connected to one end of the coil 5. The output circuit of the transformer includes a wire 8 connected to one of the taps 6 of the coil 5, a variable impedance load 11 in which a current of constant amperage is required, and a return wire 12.

The regulator shown in Fig. 1 may be used with a constant voltage supply circuit which is either a single-phase, two-wire circuit, a three-phase circuit, or a single-phase, three-wire circuit. When it is used with a two-wire supply circuit, the wires 9 and 10 of the transformer input circuit are connected to the two supply wires and the wire 12 of the load circuit may be connected to either one of the supply wires. When it is used with a three-phase supply circuit the wires 9, 10 and 12 are connected to the three phase wires of the supply circuit in the order named. When it is used with a single-phase supply circuit having a neutral wire, the wires 9 and 10 are connected to the two phase wires of the supply circuit and the wire 12 is connected to the neutral wire of the supply circuit. In any one of these cases the wire 7 is connected to the one of the taps 6 which makes the reactance of the part of the coil 5 which is in the input circuit equal to the reactance of the condenser 1 when the metal part 3 of the core is not saturated and most desirably when the impedance of the load 11 is at full-load value. Once this adjustment has been made no further adjustment need be made to maintain a substantially constant current in the load 11, notwithstanding variations in the load impedance between zero impedance and a value which gives full load. The amperage of the load current may be regulated by connecting the wire 8 to different taps 6 of the coil 5, and will be maintained constant at the regulated value notwithstanding changes in the load impedance.

If during the operation, the load impedance 11 is increased to an overload value, or if the load circuit is opened, the current in the coil 5 will rise until the metal core 3 is saturated. A further rise will then materially increase the reactance on the coil 5, making it unequal to that of the condenser 1, thus preventing resonant conditions in the input circuit which would cause the current in the coil 5 and the voltage across the condenser 1 from reaching dangerously high values.

To illustrate the accuracy of the regulation obtained in the regulator shown in Fig. 1, the following numerical example of the use of such a regulator is given: A 230 volt, three-wire, single-phase supply circuit is connected to the wires 9, 10 and 12 in the way described above. The load 11 is a varying resistance giving full load conditions at 100 ohms. The condenser 1 has a reactance of 41 ohms and a resistance of 0.1 ohm. The input circuit of the transformer has a resistance of 0.5 ohm and a reactance which varies with changes of current in the coil 5 caused by changes in the load resistance as follows:

| Load resistance | Coil reactance |
| --- | --- |
| | Ohms |
| 0 ohms | 43 |
| 50 ohms | 42 |
| 100 ohms (full load) | 41 |
| 150 ohms | 38 |
| 200 ohms | 25 |

From the above table it will be noted that the adjustment is such that the reactance of the condenser is just equal to the reactance which the coil has under full load conditions. With this adjustment the following variations in load current are obtained with changes in load resistance:

| Load resistance | Load current (full load) |
| --- | --- |
| | Amperes |
| 0 ohms | 5.46 |
| 50 ohms | 5.45 |
| 100 ohms (full load) | 5.42 |
| 150 ohms | 5.29 |
| 200 ohms | 2.22 |

It will be noted that the variation in load current from no load to full load is less than 1 per cent. The reduction in load current under overload conditions indicates the effect of saturation of the core in ending resonant conditions in the input circuit so that there is no danger of excessive voltage across the condenser when the load circuit is opened.

The regulator shown in Fig. 1 is useful in connection with series street lighting as it can be built at small expense, and operated economically as its power factor is nearly unity, the losses are small and a constant amperage current is maintained within close limits.

Fig. 2 shows a regulator similar to that shown in Fig. 1, except that it contains a two-coil transformer instead of an auto transformer. The coil 5 of Fig. 1 is replaced by a primary coil 14 provided with taps 15 and a secondary coil 16 provided with taps 17. This regulator may be used with any constant voltage two-wire supply circuit. The supply circuit is connected to the input circuit of the regulator which consists of wires 7, 9 and 10 connecting the primary coil 14 and the condenser 1 in series. In this case the variable impedance load 11 is not connected to the supply circuit but only to the secondary coil 16 by the wires 8 and 12. The wire 7 is connected to the one of the taps 15 which makes the reactance of the primary coil 14 equal to that of the condenser when the load impedance 11 is set at full load value. The load current may be regulated by connecting the wire 8 to different ones of the taps 17 of the secondary coil 16 and the amperage will be maintained constant as before, except under over-load conditions. This form of regulator is desirable when the voltage required in the load is higher than the voltage across the condenser.

The regulator shown in Fig. 3 is adapted to maintain a constant amperage in a variable impedance load like those shown in Figs. 1 and 2 and to provide for a wider regulation of the load current than the forms already described. The transformer part of this regulator has a metal core 36, having two continuous legs and a third leg containing an air gap 37. The core 36 has a coil 40 on one of its continuous legs and two coils 38 and 39 on its other continuous leg. The coil 38 is connected in series with a condenser 35 between terminals 47 and 48. Taps from the coil 39 are brought out to terminals 42 from any ones of which connections may be made to a variable impedance load 51. Taps from the coil 40 are brought out to the terminals of a tap switch 41.

This regulator is adapted for use with a constant voltage three-phase supply circuit, the three wires of which are shown at 44, 45 and 46. One wire 46 of the supply circuit is connected to the switch 41 so that it may be connected to any one of the taps of the coil 40. The wire 45 of the supply circuit is connected to one end of the coil 40 and also to a terminal 50. The wire 44 is connected to a terminal 49.

In using the regulator shown in Fig. 3, the supply wires 44 and 45 may be connected in various different ways:

The wire 44 may be connected to the condenser by a conductor between the terminals 47 and 49, and the wire 45 to the end of the coil 38 by a connection between the terminals 48 and 50. The result is the same as connecting the regulator shown in Fig. 1 with a three-phase supply circuit in the manner already described. A greater regulation of the load current is possible since the voltage applied to the circuit containing the condenser 35 and the coil 38 is induced in the winding itself and may be made greater than the supply voltage and varied by changing the position of the switch 41. Further regulation is possible by connecting the load with different ones of the taps 42.

Another connection which may be made in using the transformer shown in Fig. 3 is to connect the terminals 48 and 50 as before, and to connect the terminal 47 to the terminal 52 which is connected to the upper end of the coil 40. This produces the same effect as is obtained by connecting the regulator shown in Fig. 1 with a three-wire, single-phase system above described. Again a greater regulation of the load current is possible than with the regulator shown in Fig. 1, by using both the switch 41 and the taps 42.

The regulator shown in Fig. 3 can take the place of two regulators of the form shown in Fig. 2 with the addition of an auxiliary transformer. The taps 41 and the taps 42 provide a wide range of regulation of the load current. As in the other regulators described, the amperage of the load current remains constant at each value at which it may be set by these means and is not substantially altered by changes in the load impedance 51. This result is obtained by making the reactance of the condenser 35 equal to that of the coil 38 under full load conditions. The necessary equality of reactance may be obtained by providing taps on the coil 38 like the taps 6 of Fig. 1, or the taps 15 of Fig. 2, or the regulator may be initially constructed so that the reactances are equal, in which case such taps are unnecessary.

The stepping up of the voltage permitted by the regulators of Figs. 2 and 3 is unnecessary in series arc lighting circuits but is useful in circuits containing gaseous tube transformers and welding outfits. Regulators of Figs. 2 and 3 are well adapted for use in such circuits.

What I claim is:

1. A current regulator for alternating current power circuits, comprising a transformer having a metal core containing an air gap, a condenser connected in series with an input circuit of the transformer and having a reactance which is substantially equal to the reactance of the input circuit of the transformer when the metal core is unsaturated.

2. A current regulator for alternating current power circuits, comprising the combination with a transformer having a metal core containing an air gap, an input circuit whose resistance is low compared to its reactance and an output circuit, of a condenser connected in series in the input circuit and having a reactance which is substantially equal to the reactance of the input circuit when the core is unsaturated and is unequal thereto when the core is saturated, whereby a supply of alternating current at constant voltage to the input circuit will supply a current of constant amperage in a variable impedance load connected to the output circuit when the core is unsaturated, and excessive stresses on the condenser are avoided under all conditions.

3. A current regulator for alternating current power circuits, comprising the combination of a transformer having a metal core containing an air gap, an input circuit whose reactance is high compared to its resistance and decreases slightly on increases of current up to the saturation point of the core and then decreases sharply, a variable impedance load connected in the output circuit, and a condenser connected in series in the input circuit and having a reactance equal to the reactance of the input circuit when the load impedance is at full-load value.

4. A current regulator for alternating current power circuits, comprising the combination of an auto transformer having a metal core containing an air gap and a coil having a resistance which is low compared to its reactance, a condenser connected in series with said coil and having a reactance which is substantially equal to the reactance of the coil when the core is unsaturated and is unequal thereto when the core is saturated, whereby a current of substantially constant amperage may be maintained in a variable impedance load connected in the output circuit of the transformer when a constant voltage alternating current is connected to its input circuit, and excessive stresses on the condenser are avoided under all conditions.

5. A current regulator for alternating current power circuits, comprising the combination of an auto transformer having a metal core containing an air gap and a coil having a resistance which is low compared to its reactance, a condenser connected in series with said coil and having a reactance which is substantially equal to the reactance of the coil, a variable impedance load connected to said coil, and a three-wire source of constant voltage alternating current having one wire connected to said condenser, one wire connected to said coil and one wire connected to said load, whereby a current of substantially constant amperage is maintained in said load.

6. A current regulator for alternating current power circuits, comprising the combination of an auto transformer having a metal core containing an air gap and a coil having a resistance which is low compared to its reactance, a condenser connected in series with said coil and having a reactance which is substantially equal to the reactance of the coil, a variable impedance load connected to said coil, and a source of two-phase constant voltage alternating current, having one phase wire connected to said condenser, the other phase wire connected to said coil and a neutral wire connected to said load.

7. A current regulator for alternating current power circuits, comprising an auto transformer having a metal core containing an air gap and a coil provided with a number of taps, a condenser connected to one of said taps and in series with a part of said coil having a reactance substantially equal to the reactance of the condenser, and a conductor connected to a variable impedance load which may be attached to any of the taps of the coil.

8. A current regulator for alternating current power circuits, comprising a transformer having a metal core containing an air gap, a primary coil whose resistance is low compared to its reactance and a secondary coil, a condenser connected in series with the primary coil and having a reactance which is substantially equal to the reactance of the primary coil when the core is unsaturated and unequal thereto when the core is saturated, whereby a supply of constant voltage alternating current to the primary circuit of the transformer will produce a current of substantially constant amperage in a variable impedance load connected to the secondary circuit of the transformer while said core is unsaturated, and excessive stresses on the condenser are avoided under all conditions.

9. A current regulator for alternating current power circuits, comprising a transformer having a metal core containing an air gap, a primary coil and a secondary coil provided with taps, a condenser connected in series with the primary coil and having a reactance which is substantially equal to the reactance of the primary coil when the core is unsaturated, and a conductor connected to a variable impedance load which may be attached to any of the taps of the secondary coil.

10. A current regulator for use with a constant voltage alternating current supply circuit for furnishing a current of regulatable amperage in the variable impedance load and maintaining the regulated amperage constant notwithstanding variations in the load impedance, comprising a transformer having a core containing an air gap and three coils, two of which are provided with taps, and a condenser connected in series with a third coil and having a reactance substantially equal to that of said coil.

11. A current regulator for use with a constant voltage alternating current supply circuit for furnishing a current of regulatable amperage in the variable impedance load and maintaining the regulated amperage constant notwithstanding variations in the load impedance, comprising a transformer having a core including two continuous branches and a third branch containing an air gap, an input coil on one of said continuous branches, primary and secondary coils on the other of said continuous branches, and a condenser connected in series with the primary coil and having a reactance equal to that of the primary coil.

ROLAND R. MINER.